Inventors
Benton Bejach
Earl T. Bernhardt

Inventors
Benton Bejach
Earl T. Bernhardt
By James J. Jennings, Jr.
Attorney

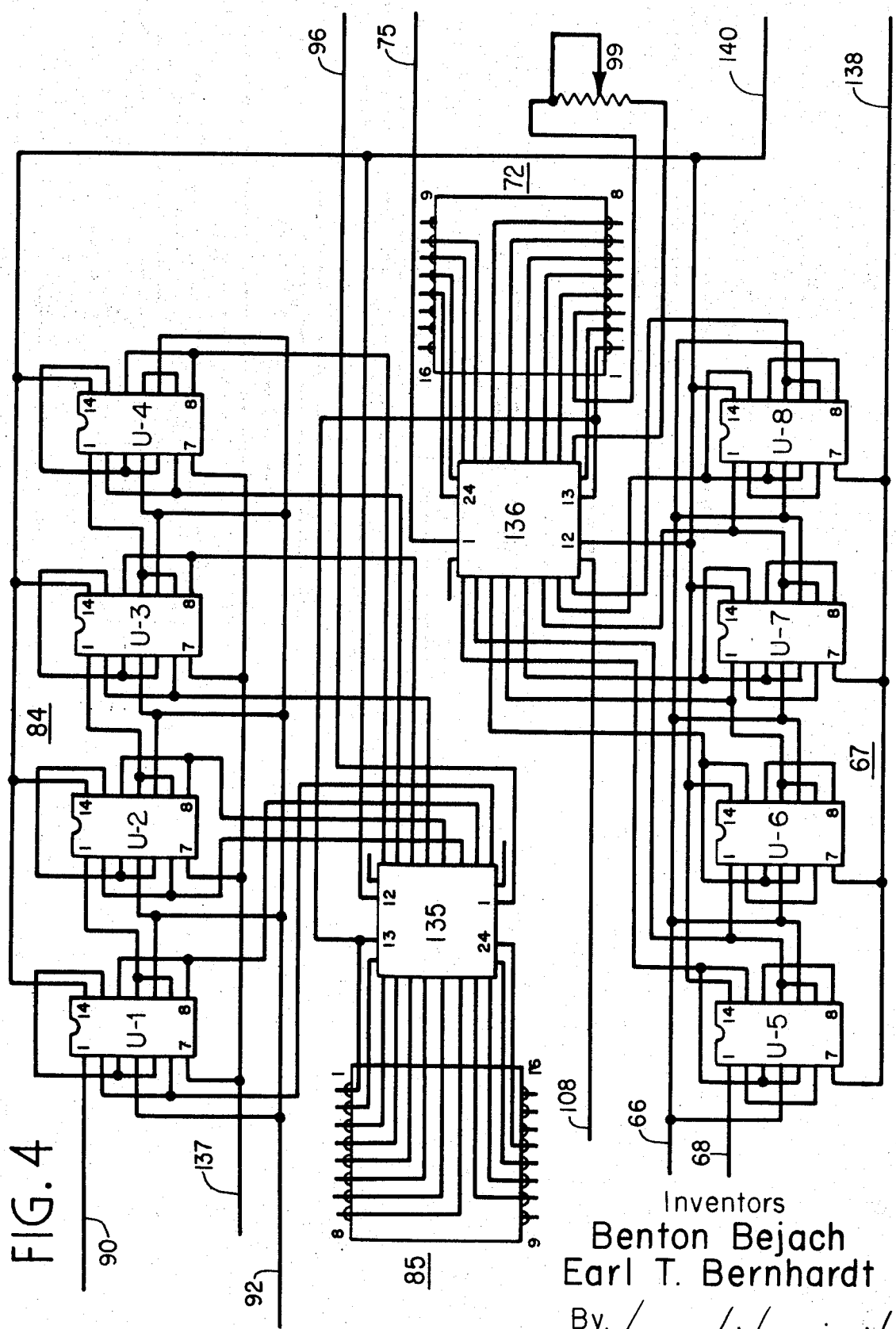

Inventors
Benton Bejach
Earl T. Bernhardt

By James J. Jennings, Jr.
Attorney

Phase Detector Signals

|  |  |  | Pot. | Voltage |
|---|---|---|---|---|
| FIG. 9A | 63 | 0° | 256 | 10V |
| FIG. 9B |  | 90° Lead | 256 | 15V |
| FIG. 9C | 63 | 90° Lead | 257 | 5V |
| FIG. 9D |  | 180° Lead | 257 | 10V |
| FIG. 9E | 63 | 270° Lead | 257 | 15V |
| FIG. 9F |  | 270° Lead | 256 | 5V |

Inventors
Benton Bejach
Earl T. Bernhardt

By *James J. Jennings, Jr.*
Attorney

United States Patent Office 3,718,845
Patented Feb. 27, 1973

3,718,845
VARIABLE SPEED MASTER-SLAVE MOTOR CONTROL SYSTEM WITH CONTINUOUS POSITION ADJUSTMENT

Benton Bejach, Santa Ana, and Earl T. Bernhardt, Costa Mesa, Calif., assignors to Borg-Warner Corporation, Chicago, Ill.
Filed June 22, 1971, Ser. No. 155,569
Int. Cl. H02p 5/46
U.S. Cl. 318—78                                8 Claims

ABSTRACT OF THE DISCLOSURE

A system for controlling the speed and synchronization of two A-C motors comprises a master VCO (voltage-controlled oscillator) for providing timing pulses to drive the master inverter which energizes the first A-C motor. A system speed control pot provides a speed set signal to the master VCO, and also to a slave VCO which controls the slave inverter that energizes the second A-C motor. A phase detector receives first and second low-frequency input signals from the loads driven by the motors. A count-up register receives high-frequency pulse signals from the master VCO and, through a DAC (digital-to-analog converter), provides a positive-going ramp signal which has its reset portion determined by an output signal from the phase detector. A count-down register receives high-frequency pulse signals from the slave VCO, through another DAC, provides a negative-going ramp signal which has its reset portion determined by a second reset signal from the phase detector. These opposite-slope ramp signals are summed with a signal from the phase detector to provide a D-C control signal which is used as a second input signal to the slave VCO, thus maintaining motor synchronization. An out-of-sync signal overrides the D-C control signal and provides a modified D-C signal to the slave VCO to drive the second motor toward synchronization. The D-C control signal can also be modified by a position control signal, to provide an unlimited position variation of the second A-C motor without disturbing the synchronized speed relationship of the two motors.

BACKGROUND OF THE INVENTION

In the motor control art different systems have been developed and then improved in an effort to achieve not only good speed regulation but also synchronization between the operating speeds of two or more electrical motors.

Much of this effort has been expended on systems which use A-C motors driven from inverters, because such motors are generally simpler, more rugged and less expensive than D-C motors. One control system for synchronizing two motors utilizes tachometers or other devices to provide signals indicating the actual rotation speeds of the motors, or the speeds of the loads driven by the motors. A phase detector circuit is frequently employed to compare the two speed-indicating signals, and thus indicate any speed (or synchronization) difference by a change in the output signal of the phase detector.

A recent significant advance in this art includes the addition of first and second regulating channnel each producing a regulating signal having a parameter which varies as a function of the timing pulses which govern one of the inverter-controlled motors. Each regulating signal is periodically reset by the phase detector circuit. The regulating signals are summed to produce a D-C control signal to modify the operation of the second two motors. This system not only maintains two motors operating at the same speed or at synchronized speeds, but also insures precise in-phase operation to maintain an exact physical correlation between the driven loads.

A primary object of this invention is to further improve the described system to afford a modification of the D-C control signal so as to produce a physical displacement of the second of the two motors, relative to the first. The primary object includes the provision of a range of relative displacement, or slave (motor or load) position adjustment, which is unlimited. Such relative displacement changes the relative positions of the driven loads without losing the synchronized speed operation between the two A-C motors.

SUMMARY OF THE INVENTION

The present invention is useful with a variable speed master-slave motor control system for regulating the speeds of, and maintaining synchronism between, the motors by governing the operation of the inverters which energize the motors. The system may include first and second sensors for providing first and second series of position-indicating signals as the master and slave motors are driven, and first and second regulating channels having output portions coupled to a common summation point to provide a D-C control signal. This signal in turn is used to modify the operation of the slave motor, to maintain synchronism between the master and slave motors.

In accordance with this invention a position adjust assembly is provided, having first and second controllable means such as potentiometers for providing gradual signal changes as a function of a given mechanical displacement. A switching means is connected for actuation by the same mechanical displacement, for preparing a transition from one to the other of the controllable means. A third sensor is positioned to provide a third series of position-indicating signals which varies as a function of the slave A-C motor operation but is displaced in time with respect to the second series of position-indicating signals. Circuit means is included, and coupled both to the position adjust assembly and to the second and third sensors. This circuit means is connected to be operative after the switching means has been actuated, to effect the transition between the one and the other of the controllable means. This regulated transition provides continuous position adjustment of the slave motor without any loss in synchronism between the master and slave motors.

THE DRAWINGS

In the several figures of the drawings, like reference numerals identify like components, and in the drawings:

FIGS. 4 and 5 are schematic diagrams illustrating circuit details of the system shown more generally in FIG. 2;

FIGS. 9A–9F are graphical illustrations, useful in understanding the operation of the invention.

GENERAL SYSTEM DESCRIPTION

Figure 1:
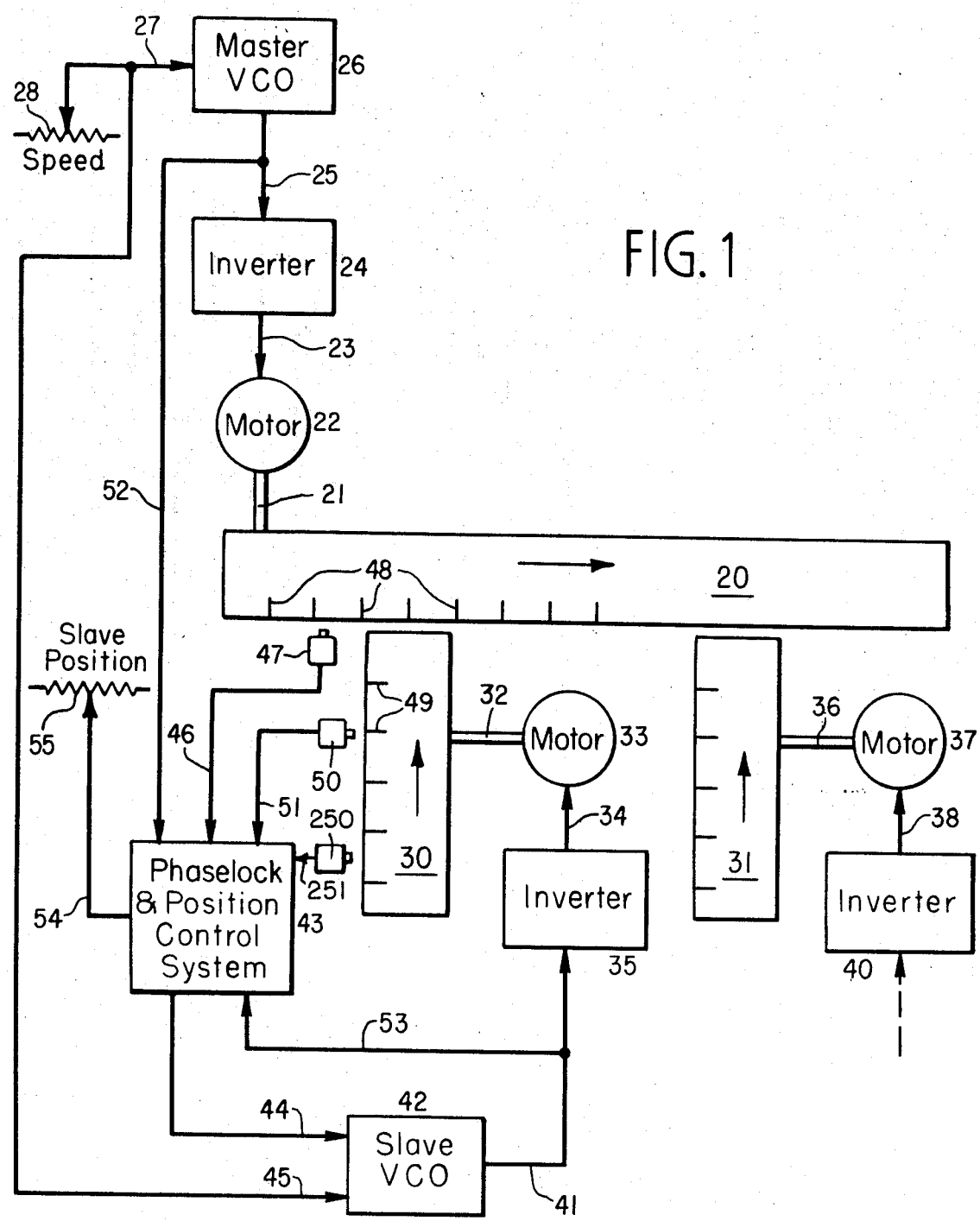
FIG. 1 is a general equipment layout showing a master-slave motor speed control system, with this invention depicted in a general form.

FIG. 1 depicts a general material transport arrangement in which a reference conveyor belt 20 is driven over a mechanical coupling 21 from a first A-C motor 22. In turn the A-C motor is energized over line 23 by the A-C voltage output from a first inverter 24. The frequency of inverter operation is determined by timing pulses received over line 25 from a master source of timing pulses, depicted with the general legend of a voltage controlled oscillator (VCO). The rate at which these timing pulses issue from VCO 26 is determined by a speed set signal received over line 27 from a system speed control unit 28. This unit can be a potentiometer, as shown, or any other suitable means of providing an adjustable D-C voltage to effect a variation in the frequency of the pulses provided by master VCO 26. Thus the setting of speed pot 28 regulates the rotational speed of motor 22, and thus governs the rate of linear displacement of conveyor belt 20.

For purposes of explaining the invention it is assumed that subassembly conveyor belts 30 and 31 are arranged at right angles to the main belt 20, to feed material or parts toward (and perhaps onto) main belt 20 at a rate which should be precisely synchronized with the speed of the main belt 20. Precise synchronization, as used in this specification and the appended claims, does not mean only an exact 1:1 correspondence between the speeds of the conveyor belts or their driving motors. It may be that the subassembly conveyor 30 carries units to be assembled in a manner such that four units from belt 20 are to be attached directly to a single component passing on main conveyor 20. In this case the auxiliary belt 30 would be driven four times as fast as main conveyor belt 20. Thus the term "synchronization" embraces both 1:1 correspondence, and other ratios of speeds between the conveyor belts and their driving motors.

The subassembly belt 30 is driven over a mechanical linkage 32 from a second A-C motor 33, which in turn is energized over line 34 from a second or slave inverter 35. The additional subassembly conveyor 31 is similarly driven over a linkage or shaft 36 from a third A-C motor 37, which is energized over line 38 a third inverter 40. The subsequent explanation will make it evident that additional motors and their energizing inverters can be utilized, and driven in synchronization with the master motor 22 which drives the main conveyor 20. The principles of this invention will be described in connection with the driving relationship between the master motor 22 and the slave or second motor 33.

Slave inverter 35 has the frequency of its output voltage determined by pulses received over line 41 from a first output connection of a slave VCO 42. A phaselock and position control subsystem 43 receives four different input signals and provides a single output control signal over line 44 to regulate the frequency of the slave VCO, in conjunction with another signal received over line 45 from the speed pot 28 which also determines the frequency of the pulses from master VCO 26. Subsystem 43 receives a first series of position-indicating signals over line 46 from a first detector 47 positioned adjacent main conveyor belt 20. The sensor 47 can be a magnetic type unit which issues an output pulse over line 46 each time one of the magnetic units 48, embedded in the conveyor belt, passes detector 47. These magnetic units 48 are spaced apart by a distance indicating a single work space, or other arbitrary interval, in accordance with the individual manufacturing specifications. A similar series of magnetic reference markers 49 are embedded along the edge of slave conveyor belt 30, so that passage of each marker 49 adjacent detector 50 provides one of a second series of position-indicating signals for application over conductor 51 to the subsystem 43. The use of additional detector 250, to provide a second series of slave position-indicating signals over line 251, will be described hereinafter. It is emphasized that although the detectors 47, 50 are shown positioned adjacent the loads driven by the respective motors 22 and 23, the detectors could also be positioned to sense rotation of the output shafts of the A-C motors before this rotational movement is translated into linear displacement. Likewise other types of sensors could be employed. Photocells can be utilized and energized as light passes from a lamp through spaced-apart timing holes near the edge of the conveyor belts to strike the photocells and provide the first and second series of position-indicating signals to denote in some way the operating speeds of the motors 22 and 33, which in this example is accomplished by sensing movement of the loads driven by these motors.

Subsystem 43 receives a third input signal over line 52 from master VCO 26, a signal similar to that of the train of pulses applied to the master inverter. A fourth input signal to the subsystem is received over line 53 from slave VCO 42, and this fourth signal is similar to the train of timing pulses which regulates the frequency of slave inverter 35. It is noted that these third and fourth subsystem inputs are at a high frequency, that is, high with respect to the low-frequency input signals received over lines 46 and 51. To illustrate it is assumed that master VCO 26 is providing pulses on lines 25 and 52 at 360 hertz. With a three phase inverter, utilizing two semiconductor switches in each phase, this train of pulses would be divided by six in a well known circuit (not illustrated), so that the output voltage of inverter 24 would be alternating at 60 hertz. A four-pole motor 22 would thus be driven at 1800 r.p.m., or 30 revolutions per second (r.p.s.). Another frequency reduction is generally provided in gearing (not shown) between the motor shaft 21 and the driven load 20. If this reduction is of the order 20:1, then the output shaft speed is 1.5 r.p.s. Thus the actual linear displacement of belt 20 is such that the signals from sensor 47 occur at 1.5 hertz. The frequency of the signals on lines 46 and 51 is low when contrasted to the frequency of the VCO signals on lines 52 and 53.

The fifth input signal to subsystem 43 is provided over line 54 from a position control unit, depicted as a potentiometer 55. This is a general showing, and a more detailed illustration of the position control unit developed in accordance with this inventon, wll be detailed after the description of the general system. As will become apparent from the subsequent explanation, a change in the voltage level passed over line 54 provides a slight position change at the output shaft of slave motor 33, with a consequent adjustment of the linear position of auxiliary conveyor belt 30 relative to belt 20. It is important to note that this position control to provide precise alignment of the work stations is effected without disturbing the continued synchronization between the operation of master motor 22 and slave motor 33.

DETAILED DESCRIPTION OF THE GENERAL SYSTEM

Figure 2:
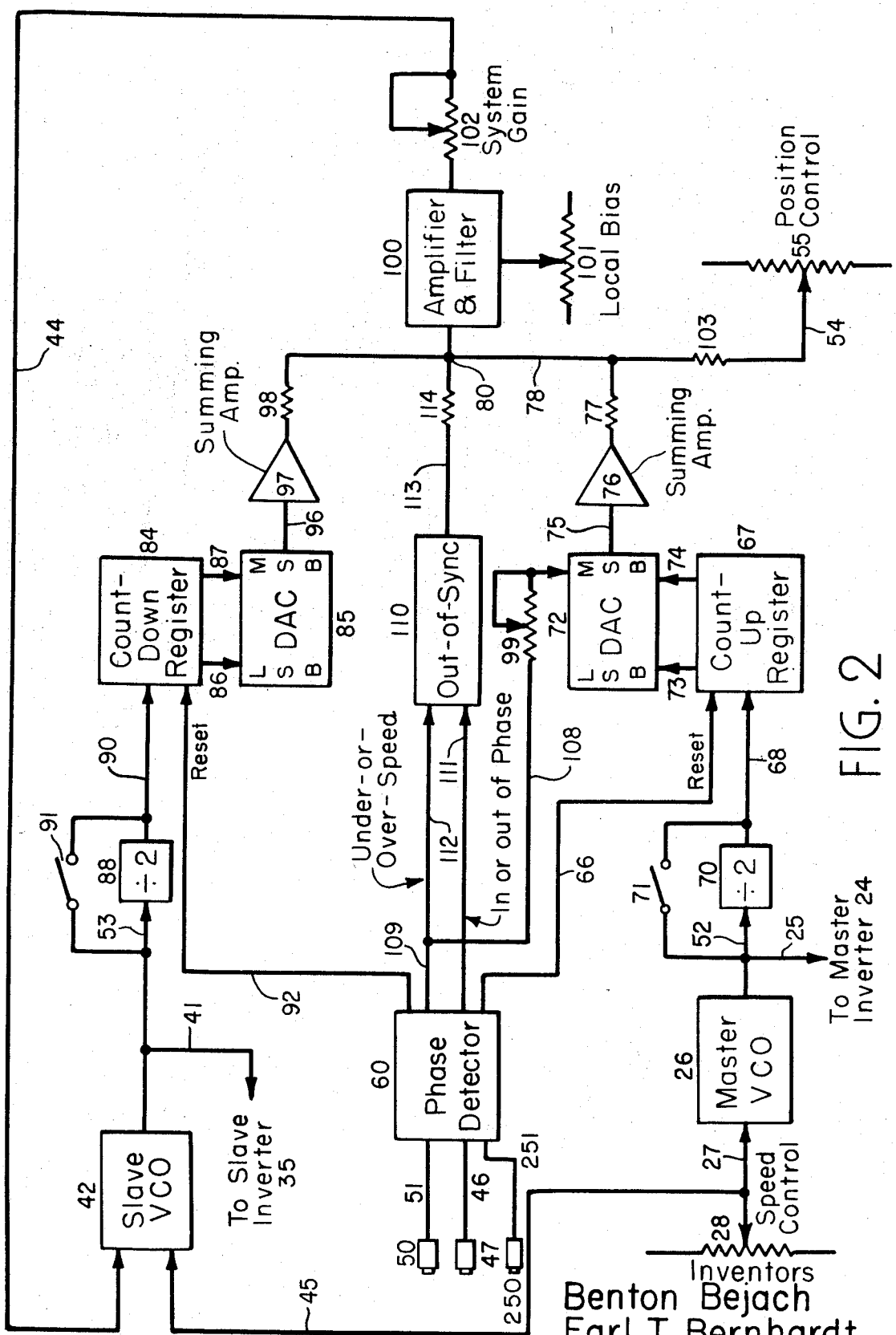
FIG. 2 is a block diagram, partly in schematic form, depicting the general arrangement of one system shown only generally in FIG. 1.
Figure 3A:
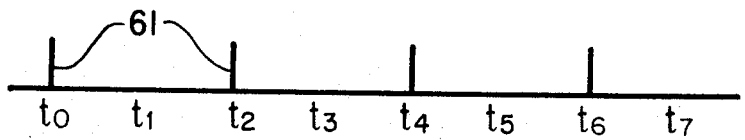
FIGS. 3A–3J are graphical representations useful in understanding operation of the system shown in FIG. 2.
Figure 3B:
Figure 3C:
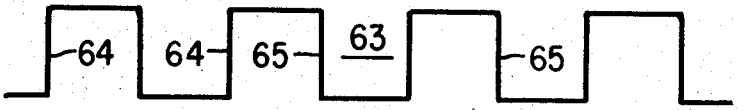

FIG. 2 depicts the major components of subsystem 43, their connections with the master and slave VCO's, and with the low-frequency signal detectors 47, 50 and 250. The subsystem 43 includes a phase detector 60, having three input connections for receiving the low-frequency position-indicating signals over conductors 46, 51 and 251. It is assumed for purposes of this explanation that the system of FIG. 1 is driving the motors 22 and 33, and thus belts 20 and 30, at the same speed, and that the subsystem is maintaining a precise 1:1 synchronization between the motor speeds. Under these conditions magnetic "markers" 48 pass detector 47, and a first series of low-frequency position-indicating signals 61, as shown in FIG. 3A, is passed over line 46 to phase detector 60. These signals 61 vary as a function of movement of first motor 22, and of primary conveyor belt 20. Under in-sync conditions, detector 60 is also receiving a second series of low-frequency position-indicating signals 62 (FIG. 3B) over line 51 from detector 50. For this explanation, detector 250 is not necessary; it will be described hereinafter. The physical position of either—or both—detectors 47 and 50 can be adjusted to provide the spacing of pulses 61 and 62 shown in FIGS. 3A and 3B when the system is in synchronization. If the auxiliary or slave conveyor 30 is driven faster than belt 20, a count-down unit (not shown) can be coupled in series with line 51 to compensate for the speed difference. For example, if belt 30 were driven twice as fast as belt 20, then such unit would pass a single output pulse over line 51 for each two pulses received from detector 50. The position-indicating signal 61, 62 govern phase detector 60 in the generation of a square-wave signal 63 as shown in FIG. 3C. The positive-going portion of each pulse, referenced 64, is determined as magnetic marker 48 passes detector 47 and signal pulse 61 is applied over line 46 to the phase detector. The term "determined" means the occurrence in time, as used in this explanation and in the appended claims. Similarly the negative-going portions 65 of the waveform 63 are determined upon each receipt of a signal over line 51 from detector 50 adjacent slave conveyor belt 30.

As each reference pulse 61 is received over line 46, conventional circuitry within the phase detector reshapes the pulse. The reshaped pulse is passed as a reset or trigger signal over line 66 to a first input connection of a first register 67. This first register or counter is termed a count-up register because, after being reset by a low-frequency signal such as 61 received over line 66, the register begins to count or total the high-frequency pulses received over line 68 from the master VCO 26. A divide-by-two circuit 70 is shown coupled between master VCO 26 and the count-up register 67. The divide-by-two circuit 70 can be bypassed by closing switch 71. Those skilled in the art will understand the divide-by-two circuits permit the use of larger speed reduction ratios, since ratios larger than that given in the example above (360:1.5) require more count-up register capacity.

After reset, register 67 begins to accumulate the high-frequency timing pulses received over line 68. A digital-to-analog converter (DAC) 72 is shown coupled over first and last lines 73, 74 to count-up register 67. Line 73 is shown at the least significant bit (LSB) end of the DAC. Line 74 is adjacent the most significant bit (MSB) end, and is actually coupled to the MSB-1 connection. Of course there art at least eight additional connections between lines 73 and 74, but they are omitted for the sake of describing the system concept and signal flow. The actual MSB connection of DAC 72 is coupled over variable resistance 99, and conductors 108, 109 to phase detector 60. With this arrangement adjustment of resistor 99 regulates the weighting of the phase detector signal to match the exact high/low frequency ratio of each particular equipment installation. This high/low frequency ratio can be any real, non-integer number. Moreover the master and slave high/low frequency ratios need not be identical. The digital total accumulated in count-up register 67 is translated into an analog signal in DAC 72, and this analog signal is passed over conductor 75, first summing amplifier 76, first mixing resistor 77 and conductor 78 to summation point 80. Of course the same potential or same signal which appears on conductor 78 is also present at point 80, but it is convenient to have a single reference such as "summation point" to characterize the location at which a D-C control signal will be developed to assist in regulating slave VCO 42.

Figure 3D:

Another way of viewing the first register-and-DAC combination 67, 72 is to consider them as a single function generator. Such a generator produces a waveform of the type referenced 81 in FIG. 3D. This first ramp signal 81 has its reset portion 82 in each cycle determined by receipt of a first reset signal over line 66 from the phase detector. The slope of first ramp signal 81 is represented by portion 83, and the amount of slope is a function of the rate at which the high-frequency timing pulses are received over line 68.

Figure 3E:

Another register-and-DAC combination is provided, including a count-down register 84 and its DAC 85. Lines 86 and 87 provide the LSB and MSB connections between the register and the DAC; the additional connections are omitted for the sake of simplifying the discussion. High-frequency timing pulses from slave VCO 42 pass over line 53, divide-by-two circuit 88, and line 90 to the count-down register. A switch 91 is provided to bypass circuit 88 when required to accommodate a large than normal speed (frequency) ratio. Register 84 also receives a reset signal over line 92 from phase detector 60. The reset signal is similar to the low-frequency position-indicating signal 62 shown in FIG. 3B. Each pulse 62 is reshaped in phase detector 60, and then passed over line 92 to the count-down register 84. The total of the high-frequency pulses received over line 90 is continuously accumulated in register 84 and converted in DAC 85, to produce a second ramp signal shown as 93 in FIG. 3E. Reset portion 94 of this second ramp signal 93 is virtually coincidental in time with the slave marker pulse 62, and the sloping portion 95 of this second ramp signal has its degree of slope vary with variation of the rate at which the high-frequency timing pulses are received from slave VCO 42. Thus the second ramp signal 93, displaced in phase with respect to the first ramp signal 81 as shown, is passed over conductor 96, a second summing amplifier 97 and second mixing resistor 98 to summation point 80. The summing amplifiers 76, 97 and their respective fixing resistors 77, 98 can be considered as a means for combining the ramp signals to provide a D-C control signal at the summation point.

Figure 3F:
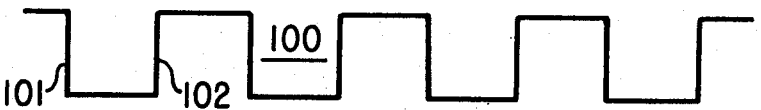

Inspection of the first and second ramp signals 81 and 93 shows that by combining these signals a square wave signal 100 (FIG. 3F) will be produced. The sloping portions of the ramp signals have opposite polarities and thus produce a virtually constant D-C voltage. However the first negative-going transition 82 of the first ramp 81 is reflected as the negative-going portion 101 of the square wave 100, and the positive-going or reset portion 94 of the second ramp signal 93 appears as the portion 102 of the resultant square wave. Inspection also shows this resultant square wave 100 is a mirror image of the square wave signal 63 produced by phase detector 60. Accordingly signal 63 is passed over lines 109, 108 and resistor 99 to the MSB connection of DAC 72, where it is added to the first ramp signal 81. The effect of this addition is to displace the first ramp signal 81 by 180°, and thus the resultant signal which appears at summation point 80 will be a virtually constant D-C control signal.

This D-C control signal is passed from summation point 80 through an amplifier-and-filter stage 100, which includes a local bias adjusting unit 101 for regulating the gain of an amplifier stage within circuit 100. The D-C control signal is then passed from circuit 100 over the effective portion of a variable resistor 102 to line 44. Adjustment of the system gain unit 102 regulates the loop gain in the feedback system over line 44 to slave VCO 42. The D-C control signal on line 45 is mixed with the D-C control signal received over line 44 within slave VCO by any conventional mixing circuit (not shown). This circuit can be a pair of equal-value resistors connected in the mixing arrangement in much the same way resistors 77, 98 are tied to a common summation point 80. In effect the first D-C signal from speed control pot 28 applied over line 45 insures that slave VCO produces timing pulses which will maintain slave motor 33 in precise synchronization with the master motor 22. The D-C control signal passed from summation point 80 over line 44 to the other input connection of slave VCO 42 is exactly the same D-C level as that received over line 45 when the system is operating in synchronization.

In accordance with the general showing of this invention, the movable arm of position control unit 55 can be displaced to effect a slight position change of auxiliary conveyor 30 relative to the reference position of master conveyor 20. Normally the movable arm of potentiometer 55 would be set in the mid-range position so that the voltage signal passed over line 54 and third mixing resistor 103 to summation point 80 is exactly the same D-C voltage as would appear at point 80 from normal system operation with synchronization between the motors. The value of mixing resistor 103 is small, preferably at least an order of magnitude smaller, than the values of the mixing resistors 77 and 98. Thus a change in the potential at the movable tap of position control pot 55 in effect swamps out the normal D-C control signal provided over the summing amplifiers. This produces a modified D-C signal at summation point 80, which signal is passed over the feedback loop and line 44 to the slave VCO. The result of this A-C voltage change is to produce a slight phase unbalance of the system which in turn results in a corresponding incremental physical change in the position of slave motor 33 and thus of auxiliary conveyor belt 30. Following adjustment of slave position pot 55, the phase detector and DAC signals will automatically readjust such that the summed signal level at point 80 is identical to the level which existed before the adjustment was made. The more detailed showing of continuous position adjustment for the auxiliary conveyor belt 30 will be set out after the exposition of the general system.

One way of viewing this controlled phase displacement to produce a position change is to consider two cars moving in the same direction and at precisely the same speed on a highway. If both cars are travelling at 60 m.p.h., they are always maintained at precisely the same relative positions. Suppose the driver of the trailing car desires to maintain the same speed, but also wants to pass the leading car. To do this he accelerates for a brief time to move out and pass the lead car, and then pulls back into the lane to become the lead car at exactly the same speed as the car he just passed. Once again there is a steady relationship in the relative positions of the two cars. This analogy is not perfect, but it conveys somewhat of the operation in which the slave conveyor can be adjusted in position relative to the main conveyor, to obtain precise alignment of the complete system.

Figure 3G:
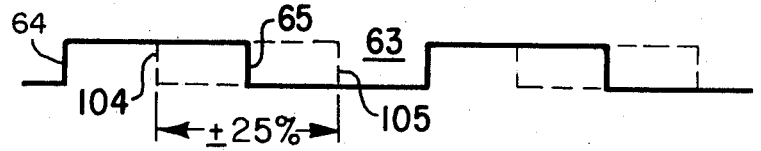

The effect on the system of FIG. 2 of adjusting the tap of position control pot 55 is shown in FIG. 3G. The normal phase detector output signal 63 is there shown on a scale expanded relative to that of FIG. 3C. By modifying the resultant D-C voltage at summation point 80, the trailing or negative-going portion 65 of the waveform can be displaced approximately plus or minus 25% to produce a corresponding linear adjustment range of the auxiliary conveyor belt. The trailing edge 65 can be "moved" to the left, to the position referenced 104, or the pulse width can be extended and the edge 65 moved to the right to the point referenced 105. The phase adjustment thus afforded represents an important motor control system improvement which is achieved by this invention. The detailed explanation of this phase adjustment to achieve continuous position adjustment will be set out after the description of the general system (FIG. 2) is completed.

Figure 3H:
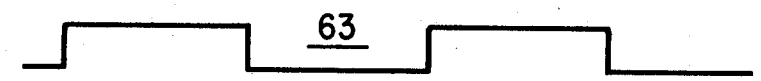
Figure 3I:
Figure 3J:
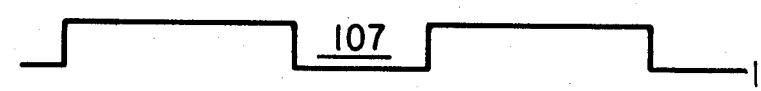

The phaselock position control subsystem 43 can be utilized to regulate induction motors. Position accuracy of such a system is less than that achieved with synchronous motors, because with an induction motor the slip varies with the load and thus degrades the resultant accuracy. However for those systems with a relatively constant load, or those which are load cycled at the same rate as the job space (magnetic marker intervals), system accuracy can be provided within 1%. The effects of variation in load in a system utilizing induction motors are shown in FIGS. 3H, 3I and 3J. The normal in-sync condition with a resultant waveform 63 is repeated in FIG. 3H. With a 100% load on the slave motor only, the phase detector output signal would be modified approximately to that depicted as signal 106 in FIG. 3I. A 50% load would modify the phase detector output signal to produce that identified as 107 in FIG. 3J. Even with these slight changes the synchronization of the two induction motors is maintained with the system shown in FIG. 2. Slave VCO 42 operates at a higher frequency than does master VCO 26, thus compensating for the slip r.p.m. inherent in the induction motor.

Another important component of the system is the out-of-sync circuit 110 shown in FIG. 2. Circuit 110 receives a first signal from the phase detector 60 over line 111, in effect "telling" the out-of-sync circuit 110 whether the system is in phase or out of phase at a given moment. This phase condition is readily determined by a simple circuit within phase detector 60, which compares receipt of the reference marker pulses 61 with receipt of the slave marker pulses 62. As long as these pulses are received alternately, it is manifest that the system is operating in sync; this is indicated by a logic signal passed over line 111 to out-of-sync circuit 110. The sense of this logic signal is reversed if two reference marker pulses 61 are received without the intervening receipt of a slave marker pulse 62, or if two marker pulses 62 are received without receiving any reference marker 61. The other logic signal applied over lines 109 and 112 indicates whether the system is under or over speed when an out-of-phase condition exists. This is also simply determined in the phase detector. If two reference pulses 61 are received before one slave pulse 62, then the system is under speed and a first logic signal is provided over conductors 109, 112. However if two slave pulses 62 are received before a single reference marker 61, then the system is over speed, and the opposite sense of logic signal is provided over conductors 109 and 112 to out-of-sync circuit 110. The details and operational description of circuit 110 will be given hereafter in connection with FIG. 5. For the present it is sufficient to note that whenever the system is out-of-phase, an appropriate correcting signal is passed from out-of-sync circuit 110 over line 113 and a fourth mixing resistor 114 to summation point 80. Like the third mixing resistor 103, the value of the fourth mixing resistor 114 is small with respect to the values of the first two mixing resistors 77 and 98. Accordingly any correction signal provided by the out-of-sync circuit also swamps the normal D-C control signal at summation point 80, providing a modified D-C signal which is passed over circuit 100, system gain pot 102 and conductor 44 to the other input connection of slave VCO 42. This signal is in a direction to correct the operation of the system by changing the frequency of the timing pulses issued from slave VCO 42 over line 53 to the count-down register 84.

PHASE DETECTOR CIRCUIT 60

Integrated circuits are now available to supply the functions of phase detector 60. One such IC is the Motorola MC4044. The interconnection and operation of such phase detectors will be understood by those skilled in this art.

REGISTERS-AND-DACS: FIG. 4

FIG. 4 illustrates the provision and interconnection of a plurality of integrated circuits to form the count-up and count-down registers and their associated DACs. The modules designated U-1 through U-8 can be Fairchild 9093 modules, each of which comprises two flip-flops. Those skilled in the art will appreciate that other logic circuits can be substituted, to provide a divide-by-four function in each of the modules. The pin connections from 1 through 14 are shown in sequence around each of the modules U-1 through U-8. In addition, pins 1, 7, 8 and 14 are identified to assist those skilled in this art to interconnect and operate this invention. The two modules designated 135 and 136 represent current sources, each individually coupled between its associated register and DAC. These units can be Fairchild 722 type sources or other suitable units. The pin connections are also indicated in sequence, with numbers 1, 12, 13 and 24 being inserted to assist those skilled in the art to make the interconnections most expeditiously. The DAC's 72 and 85 can be resistive lattice networks, for example, of the MEPCO type MC400-14. The 1, 8, 9 and 16 pins are identified in these networks to depict their intercoupling with the associated current source and register.

Line 137 receives a plus 6 volt potential, as does line 138, at the bottom of FIG. 4, applying this potential to the 7 pin of each of the modules in the registers. A voltage of plus 11 volts is applied over conductor 140. With this arrangement the required count-up ramp signal is provided on line 75, and the second or count-down ramp signal on line 96, as described previously in connection with FIG. 2.

Figure 5:
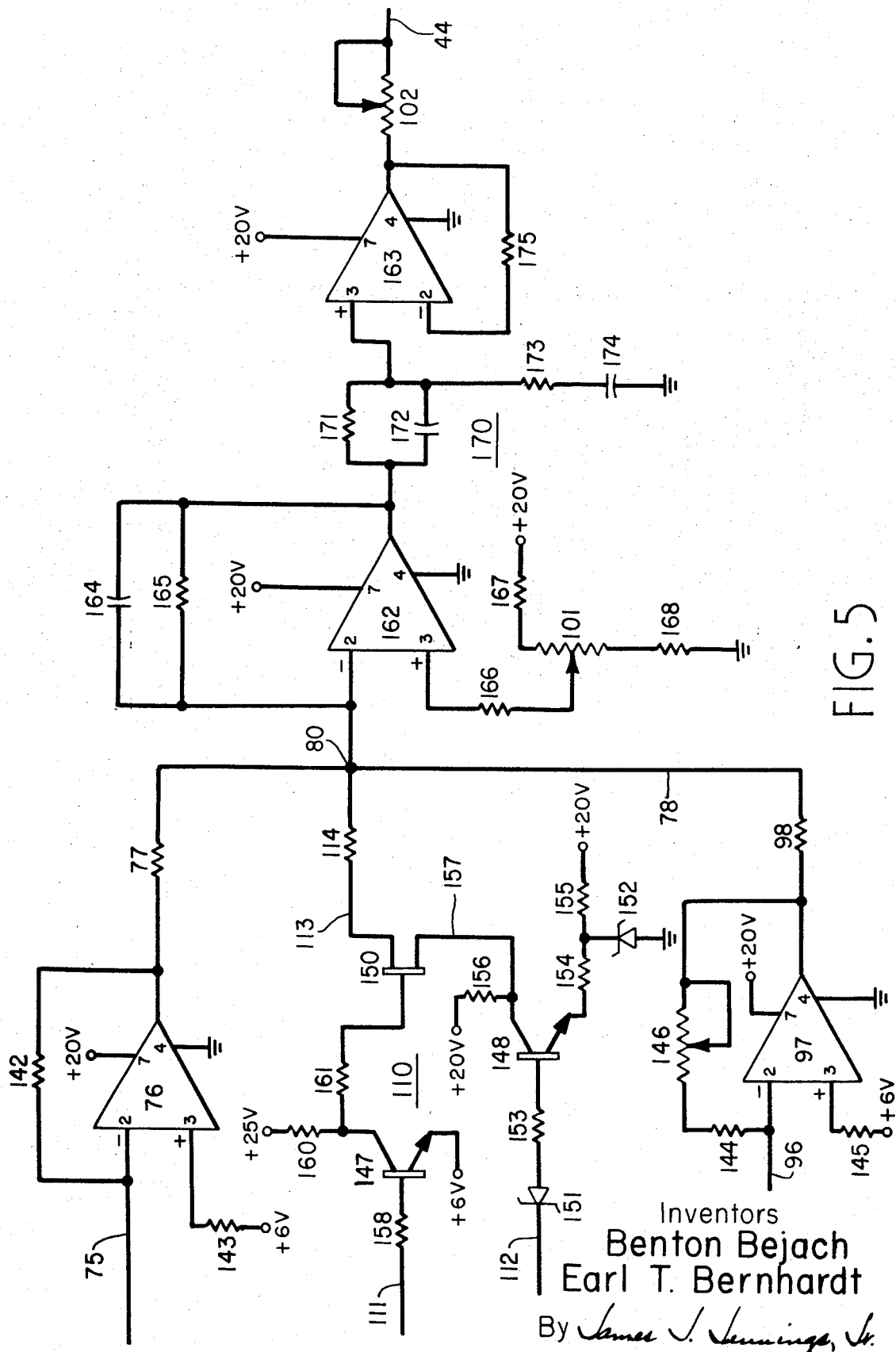

OUT-OF-SYNC CIRCUIT, SUMMING AMPLIFIERS, AND AMPLIFIER-AND-FILTER CIRCUIT: FIG. 5

In FIG. 5 the legends for the appropriate energizing voltage levels are shown adjacent the terminal connections in the different stages. This is especially helpful in understanding the operation of out-of-sync circuit 110. The summing amplifiers 76 and 97 are illustrated with their appropriate pin connections, referring to Fairchild op amps of the 741 type. In the circuit of first summing amplifier 76, a resistor 142 is coupled between the output connection and input connection 2. Another resistor 143 is coupled between the other input terminal 3 and a terminal to which a plus six volt potential is applied. In the second summing amplifier stage, resistors 144 and 145 are similarly connected. In addition, a variable resistor 146 is coupled between resistor 144 and the output connection of summing amplifier 97 to provide gain adjustment. The adjustment trims the gain of amplifier 97, such that under normal conditions the sloping portions 83 and 95 of waveforms 81 and 93 are identical in slope. This is required because even precision DAC's are not matched to one another. These stages provide a D-C control signal at summation point 80 as previously described.

Considering now the out-of-sync circuit 110, a pair of NPN type transistors 147 and 148 are connected in the circuit, together with a field-effect transistor (FET) 150. Zener diodes 151 and 152 are also coupled in this circuit as shown.

For purposes of this explanation, it is assumed that a logical one signal is a positive signal, of a level sufficient to rapidly drive on transistors 147 and 148. When this entire system is operating normally and the desired synchronized relationship is maintained between the master and slave motors, then the signals on lines 111, 112 are logical zeros and circuit 110 does not operate to modify the D-C control signal at summation point 80.

Considering first the start-up condition of the system, this is similar to an underspeed condition, where "underspeed" signifies that the slave motor is operating at a speed under that indicated by the setting of speed control pot 28. In this underspeed condition, two reference or master pulses arrive over line 46 at phase detector 60 without the intervening receipt of a slave marker pulse over line 51. This produces a logical 1, or positive, signal at the output side of phase detector 60. This signal is passed over lines 109 and 112, Zender diode 151 and resistor 153 to the base of transistor 148, rapidly saturating this transistor. The emitter of transistor 148 is coupled over a series circuit including resistors 154 and 155 to an energizing terminal, and its collector is coupled over another resistor 156 to another energizing terminal. A plus 20 volts potential is applied to both these terminals. With this rapid saturation of transistor 148, the potential at its collector goes negative and this negative-going signal is applied over line 157 to the drain of FET 150.

Receipt of the two successive master marker pulses at phase detector 60 without any receipt of a slave master signal also causes a positive or logical 1 signal to appear at the output terminal coupled to conductor 111. This signal is applied over line 111 and resistor 158 to the base of transistor 147, and rapidly saturates this transistor. The collector of transistor 147 is coupled over resistor 160 to an energizing terminal which receives a plus 25 volt potential, and the collector is also coupled over a resistor 161 to the gate of FET 150. When transistor 147 was still non-conducting, a positive potential was applied over resistors 160 and 161 as a pinch-off voltage for FET 150. When the logical one signal is received over line 111 and transistor 147 is saturated, the potential at its collector rapidly goes negative and thus the pinch-off voltage is removed from the gate of FET 150. Accordingly the negative-going signal on line 157 which is appearing on the drain of FET 150 now appears on its source. This negative-going signal is passed over line 113 and mixing resistor 114 to summation point 80. Like mixing resistor 103, the resistance value of mixing resistor 114 is small, preferably at least an order of magnitude smaller, than the values of the first and second mixing resistors 77 and 98. Accordingly, the D-C control signal at summation point 80 which would otherwise be passed to the slave VCO 42 to regulate its speed is swamped out by the negative-going signal received over mixing resistor 114 from the out-of-sync circuit. As will be explained hereinafter, a negative-going signal at point 80 is inverted in circuit 100, and a positive-going signal is applied to slave VCO 42. The effect of this positive change in the level of the modified D-C voltage applied over line 44 to slave VCO 42 is to increase the frequency of the pulses applied over line 41 to slave inverter 35, to correct the underspeed condition.

Operation to correct an overspeed condition, which also occurs when the system is being shut down, is related to that just described. In the overspeed condition there is also an out-of-sync signal, or a logical 1, applied over line 111 to saturate transistor 147 and remove the pinch-off voltage from FET 150. In the overspeed mode, two slave marker pulses arrive at phase detector 60 without the intervening receipt of a master pulse. This produces a logical zero or negative signal on lines 109 and 112, and transistor 148 remains nonconducting. The positive signal at the top of resistor 156 is thus applied over line 157 to the drain of FET 150, and is passed to its source, over line 113 and mixing resistor 114 to summation point 80. Ultimately this positive-going signal is inverted to a negative change on line 43, and has the opposite effect of that just described. The result is a reduction in the frequency of the VCO pulses applied over line 41 to the slave inverter 35.

Within amplifier-and-filter circuit 100 a pair of op amps 162 and 163 are illustrated. These can be Fairchild 741 units, like the summing amplifiers 76 and 97. In the first amplifier stage the negative or 2 pin is connected to summation point 80, and also to one side of a parallel circuit including a capacitor 164 and a resistor 165. The other side of this parallel circuit is coupled to the output side of amplifier 162. The other input connection of this amplifier is coupled over resistor 166 to the movable tap of a local bias adjust potentiometer 101, which is coupled in a voltage divider circuit between resistors 167 and 168.

Between the output side of amplifier 162 and the 3 pin of amplifier 163 is a filter circuit 170. The filter circuit includes a parallel-connected portion, having a resistor 171 and a capacitor 172, in the signal path. Between this parallel-connected circuit and ground is a series circuit including a resistor 173 and a capacitor 174. Suitable values for these components and the other circuit components depicted in FIG. 5 will be given below to simplify practice of the invention.

A feedback resistor 175 is coupled between the output side of op amp 163 and the 2 pin at its input side. System gain control 102 is shown as a variable resistor coupled between op amp 163 and the conductor 44 which passes the D-C regulating signal to one input connection of slave VCO 42. The system gain can be regulated either by adjustment of system gain pot 102 or of the local bias adjust unit 101.

To illustrate the operation, in the overspeed condition a positive-going signal is applied from FET 150 to summation point 80, and thus to op amp 162. This signal is inverted in stage 162 and a negative-going signal appears at its output, which is passed over filter 170 to the 3 pin of op amp 163. There is no inversion in stage 163, and thus a negative-going signal is passed over line 44 to slave VCO 42. This negative-going signal "slows down" VCO 42, or reduces the frequency of the timing pulses passed over line 41 to the slave inverter 35.

In out-of-sync circuit 110, Zener diode 151 was a 1N706A, and 152 was a 1N747 type. The energizing voltages are shown on the schematic, and the values of the capacitors in microfarads and the resistors in ohms are set out below.

| | |
|---|---|
| 164 | 0.01 |
| 172 | 0.33 |
| 174 | 2.2 |
| 77, 98 | 51K |
| 101, 143, 145 | 2K |
| 102 | 150K |
| 114 | 7.5K |
| 142 | 2.4K |
| 144 | 2.2K |
| 146 | 500 |
| 153 | 16K |
| 154 | 1.8K |
| 155 | 1.6K |
| 156, 160 | 10K |
| 158 | 47K |
| 161 | 100K |
| 165 | 220K |
| 166 | 33K |
| 167, 168 | 3.9K |
| 171 | 200K |
| 173 | 24K |
| 175 | 20K |

It is understood that these are typical operating values to enable one skilled in this art to implement the invention with a minimum of experimentation. In no sense are these values, or the previous identification of integrated circuits and other components, a limitation on the basic concept and system configuration of this invention.

CONTINUOUS POSITION ADJUSTMENT: FIG. 6

The previous explanation sets out the operation of a system such as 43, which affords a measure of motor or conveyor adjustment as the setting of potentiometer 55 is varied. If this potentiometer is adjusted to provide an excessive position correction, symbolized by displacement of trailing edge 65 (FIG. 3G) of the phase detector output signal toward the left to approach the leading edge 64 of the pulse, or is displaced to the right past line 105 to approach the leading edge of the next pulse, the slave motor may temporarily drop out of synchronism with the master motor. Thus the range of position adjustment available with the system of FIGS. 1-5 is limited, if synchronism between the master and slave motors is to be maintained.

In accordance with this invention a position adjust assembly 255 (FIG. 6) is provided, and includes first and second controllable means depicted as potentiometers 256 and 257. The present invention also includes the addition of another sensor, identified as 250 in FIGS. 1, 2 and 6, for providing a third series of position-indicating signals on line 251. This third series of signals, like the second series of signals passed from sensor 50 over line 51 varies as a function of slave A-C motor 33 displacement or conveyor 30 movement. However the physical placement of sensor 250 with respect to the position of sensor 50 is such that the second and third series of slave marker pulses, passed respectively over lines 51 and 251, are displaced in time by the time duration it takes for one marker 49 to travel half a work position, or half the distance between two successive markers. This physical adjustment can be accomplished by placing sensor 250 intermediate two successive markers 49 when the other slave sensor 50 is directly "on," or adjacent, another one of the markers 49. Considering one rotation of slave motor shaft 32, it can be said that the slave marker pulses on lines 51 and 251 are 180° out of phase with respect to each other. By utilizing the gradual signal changes from two different controllable means or potentiometers, and also employing two different series of position-indicating signals on lines 51 and 251, with a controlled transition between these different series of signals, the phase detector 60 and the remainder of control system 43 is in effect "fooled" by the precisely regulated switching between the bias signals from the two different potentiometers. This provides unlimited position adjustment control of the slave motors, or slave conveyors, without losing synchronism between the slave units and the driving motors.

In more detail, potentiometer or controllable means 256 has a wiper arm 258, and potentiometer 257 includes a wiper arm 259. These arms are "ganged" or coupled for simultaneous mechanical displacement by a shaft represented by broken line 260. Each of potentiometers 256, 257 is coupled between a point which receives a plus 20 volt D-C energizing voltage and ground, but the connections are made in opposite senses. That is, as shaft 260 is rotated through 90° in the counterclockwise direction, starting from the position illustrated in FIG. 6, the potential on wiper arm 258 and line 273 is decreased from ten volts to five volts, while the potential on the other wiper arm 259 and conductor 274 is decreased from 20 volts (as soon as wiper 259 engages the potentiometer wire) to 15 volts. Shaft 260 also drives a cam 261 to operate a switch 267. Thus cam 261 is rotated and switch 267 is actuated by the same mechanical displacement—rotation of shaft 260—which provides gradual signal changes on lines 273, 274 as the potentiometer settings are adjusted.

Cam 261 is generally circular, and includes a raised portion 263 extending around half its circumference. The other half of the cam surface is a reduced-diameter portion 264. Lips or steps 265, 266 extend between cam portions 263, 264. Switching means 267 is positioned adjacent the cam body. This switch includes a movable contact 268, coupled to a source of 6 volt potential, and a fixed contact 270, coupled over a conductor 271 to a connection point 272. Concomitantly with the 90° counterclockwise displacement of wiper arms the 258, 259 described above, step 265 on cam 261 is displaced from the position illustrated until it engages movable switch contact 268 and moves contact 268 into engagement with fixed contact 270; this contact closure passes a plus 6 volt potential over line 271 to common connection 272. As will become apparent this actuation of switching means 267 is utilized to prepare a transition in the circuit shown in the upper portion of FIG. 6, so that either the second series of slave marker pulses on line 51 or the third series of slave marker pulses on line 251 is utilized, and only one of the potentiometer wiper arm signals is employed, in the circuit which controls the position adjustment of the slave motor or slave conveyor.

A flip-flop 275 is coupled in the bias level selector circuit, which circuit also includes an AND gate 276. These units may be conventional components such as 9093 type flip-flops, and 946 type AND gates. From terminal 277 a plus 11 volts potential is received, and this voltage level represents a logical 1 in the illustrated system. The plus 6 volts level, such as present at movable contact 268 of switch 267, represents the logical 0 level. A resistor 278 is coupled between terminals 272 and 277, and another resistor 280 is coupled between terminal 277 and one input connection of AND gate 276. The other input connection of this AND gate is coupled directly to terminal 272, which is also connected over line 281 to the lower input connection of flip-flop stage 275. The upper input connection of flip-flop 275 is coupled over line 282 to the output connection of AND gate 276 The set or center input connection of flip-flop 275 is coupled to conductor 66A, which receives reconstituted reference marker pulses from phase detector 60, similar to the reshaped pulses applied over line 66 to the count-up register 67. The upper output connection of flip-flop 275 is coupled over line 283 both to one input connection of another AND gate 284, and to the upper input connection of another flip-flop 285. The other output connection of flip-flop 275 is coupled over line 286, both to one input connection of another AND gate 287 and to the lower input connection of flip-flop 285. AND gates 284, 287 may also be of the 946 type, and flip-flop 285 can be of the 9093 type. AND gate 284 has its upper input connection coupled over line 51 to the slave marker detector 50, and AND gate 287 has its upper input connection coupled over line 251 to the additional slave marker detector 250. Thus the second and third series of position-indicating signals are always present on lines 51 and 251, respectively, when the equipment is operating. The output connections of AND gates 284 and 287 are coupled together, and over line 51A to the slave marker input connection of phase detector 60. Thus the phase detector receives either the second or third series of position-indicating signals, from detector 50 or from 250. Which series is received is determined by the state of flip-flop 275, which controls the logical output signals on lines 283, 286.

From the upper output connection of flip-flop 285, line 288 passes a signal to one input connection of AND gate 290. The other output connection of flip-flop 285 is coupled over line 291 to an input connection of AND gate 292. The other input connections of both AND gates 290, 292 are coupled together, and over a resistor 293 to a terminal 294. A plus 11 volt potential, representing a logical 1 signal level, is applied to terminal 294. Both AND gates 290, 292 may be Signetic type 8T80 devices. This device is an integrated circuit with an open collector, which will operate up to a 30 volt level. A resistor 295 is coupled between the output line of gate 290 and terminal 296, and another resistor 297 is coupled between terminal 296 and the output line of gate 292.

The output connection of gate 290 is also coupled over a resistor 298, itself coupled in parallel with a diode 300, to the gate of FET 301. The output connection of gate 292 is coupled over a similar circuit, including a resistor 302 parallel-connected with a diode 299, to the gate of another FET 303. These FET's may be of the MPF 152 type. Their drains are coupled together, and over a resistor 304 and conductor 309 to the common terminal 305 between a pair of resistors 306, 307. In a preferred embodiment these resistors were of a large ohmic value, such as 75K each. As shown these resistors are coupled in series between summation point 80 and the input connection of the amplifier and filter stage 100. Thus any control signal received at terminal 305 from the just-described system in FIG. 6, by reason of the large ohmic values of resistors 306 and 307, will effect a gradual change of the D-C signal level applied to the amplifier-and-filter stage. The source of FET 301 is coupled over line 274 to the wiper 259 of potentiometer 257. The source of the other FET 303 is coupled over line 273 to the movable arm 258 of the other potentiometer 256.

Figure 7:
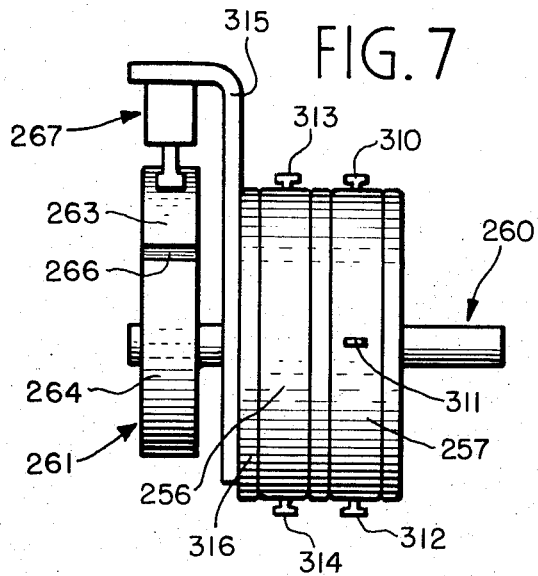
FIG. 7 is a side view of major components of the position adjust assembly of this invention.

The concomitant angular displacement of the wipers of potentiometers 256 and 257, together with cam 261, is accomplished with the assembly shown in FIG. 7. This side view indicates that rotation of shaft 260 provides a rotation of all of the three units just mentioned. The wipers of the potentiometers driven by shaft 260 are not visible. Three contacts 310, 311 and 312 of potentiometer 257 are visible, for connection to ground, to conductor 274, and to the 20 volt potential line. The two terminals 313, 314 of potentiometer 256 are provided for connection to the 20 volt line and to ground. The third terminal, for connection to line 273, is on the other side of potentiometer 256 and not visible in this side view. A support bracket 315 has one portion affixed to the insulating spacer 316, and its short leg support switch assembly 267.

Figure 8:
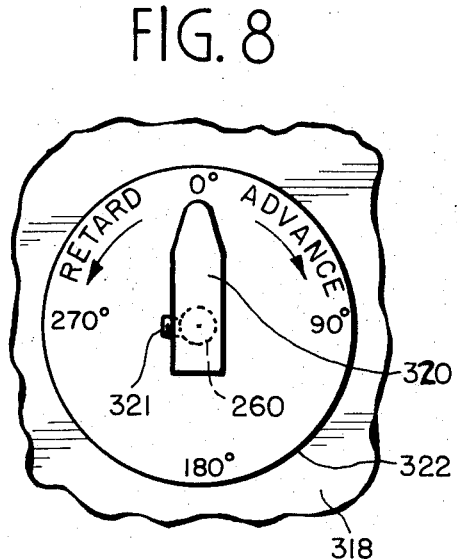
FIG. 8 is a front view of the indicator portion of this assembly.

FIG. 8 is a partial view taken from the front of a panel 318, which is a portion of the housing for the control circuitry of this invention. As there shown a pointer or indicator 320 is affixed to the end of shaft 260 by a set screw 321. The legends "ADVANCE" and "RETARD," together with suitable degree markings, are provided around the circular index 322. This affords a simple regulating means to effect the advance and retard of the slave motor position relative to that of the master motor.

Figure 6:
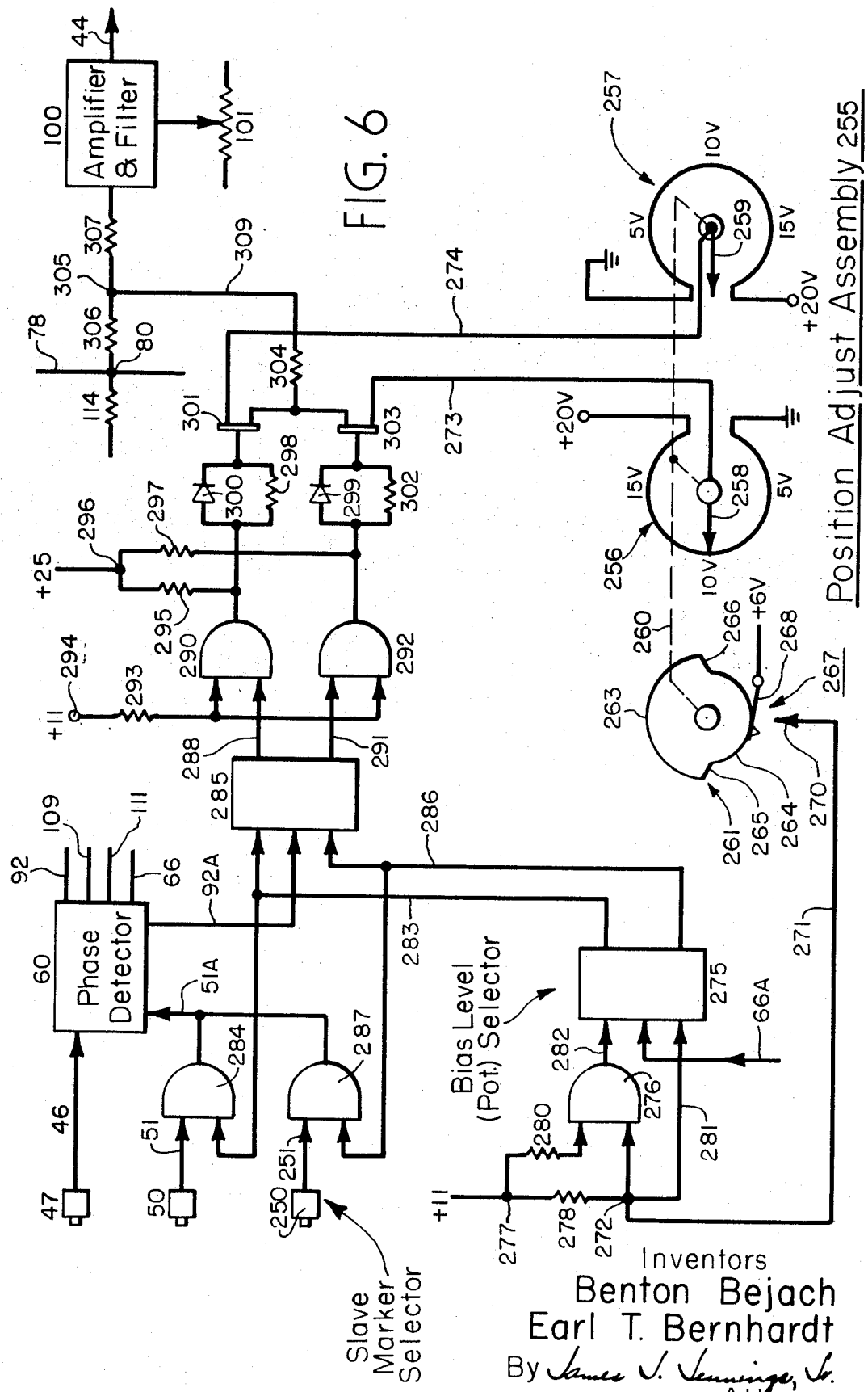
FIG. 6 is a schematic diagram showing this invention, and its incorporation in the system of FIG. 2.

To understand the operation, it is first assumed that the equipment is energized, with the pointer 320 in the 0 degree position as shown in FIG. 8, and that the cam and potentiometer positions are those shown in FIG. 6. The switch 267 is open. A logical 1 signal is passed from terminal 277 into AND gate 276, which passes a logical 0 over line 282 to flip-flop 275. With the first reference marker pulse over line 66A, the output of stage 275 will be set with a logical 0 on line 283 and a logical 1 on line 286. These signals on lines 283 and 286 will remain in these states, unless switch 267 is closed. For the present however it is considered that switch 267 remains open.

The logical 0 on line 283 is applied to one input connection of AND gate 284, and so the second series of position-indicating signals, from slave marker detector 50, does not pass through gate 284. The logical 1 from line 286 is applied to an input connection of AND gate 287, so that the third series of position-indicating signals, or the second series of slave marker signals from detector 250, passes through gate 287 and over line 51A to phase detector 60. This series of signals (on line 51A) is the one used in the phaselock and position control system 43 described above. With the first reconstituted slave marker pulse received over line 92A, flip-flop 285 will be set to provide a logical 0 signal on line 288 and a logical 1 signal on line 291. The logical state of flip-flop 285 will likewise remain unchanged until switch 267 is actuated.

A logical 1 signal is provided from terminal 294 to one input connection of both AND gates 290, 292. Receipt of the additional logical 1 signal over line 291 provides a logical 0 at the output of gate 292 which overcomes the signal previously received over conductor 297 and applied as a pinch-off voltage to the gate of FET 303. This reduction in voltage is the same as removing the pinch-off voltage. The potential from wiper 258 and line 273, which is applied to the source of this transistor, is thus passed over its drain, resistor 304 and conductor 309 to common terminal 305. In other words the output signal from potentiometer 256 is the one which is added into the control circuit to modify the potential at summation point 80 under these conditions. It is apparent that the logical state of flip-flop 275 determines which of the slave marker signals (from 50 or from 250) is used at a given time, and likewise determines which of the potentiometers 256, 257 is effective in the circuit at a given time. Under the logical conditions just explained, signals from the second slave marker detector 250 are utilized, and the potential from its associated potentiometer 256 in employed in the circuit.

It is assumed that the master and slave equipment are functioning in synchronism, and that the output signal 63 of phase detector 60 is substantially that indicated in FIG. 3C. This figure is repeated as FIG. 9A for convenience. It is further assumed that is desired to speed up or advance slave conveyor 30 with respect to these initial conditions. To effect this advance, pointer 320 (FIG. 8) is rotated to the right as indicated by the "ADVANCE" legend, or in the clockwise direction. It is further assumed that this displaces cam 261, and the wipers of potentiometers 256 and 257, in the clockwise direction (FIG. 6).

After pointer 320 has been displaced through 90°, wiper 258 of pot 256 has also moved through 90°, from the 10 volt signal level to 15 volts. The effect on the phase detector signal is depicted in FIG. 9B. At this time rise 266 on cam body 261 has just closed switch 267. However there is no change in the other portions of the circuit as the switch is closed, until the next reference pulse is received on line 66A. Thus the closure of switch 267 prepares a transition from one slave marker detector to the other and from one potentiometer to the other, but the actual transition or switching is delayed until the next pulse is received over line 66A.

A logical 0 is now being passed through switch 267 to the bias level selector stage. Responsive to receipt of the next pulse on line 66A, flip-flop 275 has its state changed to provide a logical 1 on line 283 and a logical 0 on line 286. Thus the logical 1 on line 283 makes the position-indicating signals received over line 51 effective, being passed through gate 284 and over line 51A to phase detector 60. The state of flip-flop 285 is reversed with receipt of the next pulse over line 92A, providing a logical 1 on line 288 and a logical 0 on line 291. Accordingly the logical 0 output from gate 290 overcomes the pinchoff voltage previously applied to the gate of FET 301, and the potential from wiper 259 is then passed over line 274 to the source of FET 301, through this unit, and over resistor 304 and conductor 309 to terminal 305. Thus the switching from the third detector 250 to the second detector 50 has been accomplished, concomitantly with the switching from potentiometer 256 to potentiometer 257.

This switching action is reflected in FIG. 9C. While the pointer 320 has remained at the 90° position, the output signal 63 has been modified as shown (relative to the signal in FIG. 9B), and simultaneously the voltage supplied over line 309 has been changed from 15 volts to 5 volts. It is this 180° transposition of the slave marker pulses, coupled with the simultaneous transposition between the potentiometers 256, 257, which "fools" the control system, providing unlimited adjustment of the slave unit without destroying the synchronism of the system. As pointer 320 is rotated farther, down to the 180° position, the wiper arm 259 reaches the 10 volt position and the output signal of the phase detector becomes that shown in FIG. 3D. To continue adjustment of the slave conveyor position, the rotation of pointer 320 is continued until it reaches the 270 degree position, with wiper arm 259 now at the 15 volt position. At this time the lip 265 of cam 261 has reached switch 267, allowing movable contact 268 to drop back from fixed contact 270. This interrupts the provision of the logical 0 or six volt potential over line 271, preparing stage 275 to be reset upon receipt of the next pulse on line 66A. When this next pulse is received and flip-flop 275 is changed, there is again a logical 0 signal on line 283 and a logical 1 on line 286. The phase detector signal changes from that shown in FIG. 9E to that depicted in FIG. 9F, and the 15 volt potential on line 274 is replaced by the 5 volt potential then present on line 273 as FET 303 is again placed in the circuit and the pinchoff voltage is applied to FET 301. The continued manipulation of the circuit will be apparent to those skilled in the art from the foregoing description.

While only a particular embodiment of the invention has been described and illustrated, it is manifest that various alterations and modifications may be made therein. It is therefore the intention in the appended claims to cover all such modifications and alterations as may fall within the true spirit and scope of the invention.

What is claimed is:

1. A variable speed master-slave motor control system for regulating the speeds of and maintaining synchronism between the motors by governing the operation of the inverters which energize the motors, including first and second sensors for providing first and second series of position-indicating signals as the master and slave motors are driven, and first and second regulating channels having output portions coupled to a common summation point to provide a D-C control signal for affecting the operation of the slave motor to maintain synchronism between the master and slave motors, including the improvement which comprises:

a position adjust assembly, having first and second controllable means for providing gradual signal changes to modify said D-C control signal as a function of a given mechanical displacement, and switching means connected for actuation by the given mechanical displacement to prepare a transition from one to the other of the controllable means, a third sensor positioned to provide a third series of position-indicating signals which varies as a function of the slave A-C motor movement but is displaced in time with respect to the second series of position-indicating signals, and circuit means, coupled both to the position adjust assembly and to the second and third sensors, operative after the switching means has been actuated to effect the transition between the one and the other of the controllable means, to provide continuous position adjustment of the slave motor without any loss in synchronism between the master and slave motors.

2. A variable speed master-slave motor control system as claimed in claim 1, in which said first and second controllable means in the position adjust assembly are potentiometers, and said circuit means includes a flip-flop stage, having output connections providing signals which determine both which of the potentiometer signals are utilized at a given time and which of the second and third series of position-indicating signals are utilized at a given time, said flip-flop stage also having input connections for receiving both a status signal indicating the actuated condition of said switching means and for receiving master trigger signals which vary as a function of the first series of position-indicating signals.

3. A variable speed master-slave motor control system as claimed in claim 1, in which said circuit means includes a flip-flop stage connected to provide output signals for determining both which of the second and third series of position-indicating signals is utilized in the system and which of the first and second controllable means is utilized to provide the gradual signal change for modifying said D-C control signal, which flip-flop stage has a first input connection coupled through an AND gate to receive both a logical 1 signal and a second input signal which varies as a function of the position of said switching means, a second input connection which receives a signal which is normally a logical 1 signal and can be overriden by a signal received through said switching means, and a third input connection for receiving trigger signals which vary as a function of the first series of position-indicating signals, so that said flip-flop stage is conditioned for actuation from one to another state by said given mechanical displacement and is thereafter actuated to effect a transition between these states upon receipt of the next trigger signal at the third input connection.

4. A variable speed master-slave motor control system as claimed in claim 1, and further comprising a first pair of gate circuits, one of which receives the second series of position-indicating signals and the other of which receives said third series of position-indicating signals, means including a flip-flop circuit coupled to the first pair of gate circuits for determining which of said second and third series of position-indicating signals is effective in the control system, and a second pair of gate circuits, connected to be established in states corresponding to those of the first pair of gate circuits, for determining which of the controllable means provides the gradual signal changes to modify said D-C control signal.

5. A variable speed master-slave motor control system in which first and second sources of timing pulses regulate first and second inverters which in turn drive the master and slave motors, including first and second detectors for providing first and second series of position-indicating signals as the master and slave motors are driven, a phase detector connected to receive the position-indicating signals and to pass reset signals to first and second register-and-DAC combinations for providing respective ramp signals which vary as a function both of the reset signals from the phase detector and the frequency of the timing pulses from the first and second sources, and means for combining the ramp signals at a summation point to provide a D-C control signal for affecting the speed of the slave motor, including the improvement which comprises:

a position adjust assembly, having first and second controllable means for providing gradual signal changes to modify the D-C control signal as a function of a given mechanical displacement, a third detector positioned to provide a third series of position-indicating signals which also varies as a function of the slave A-C motor movement but is displaced in time with respect to the second series of position-indicating signals, switching means, positioned for actuation by a cam driven by said given mechanical displacement, to prepare a circuit for subsequent operation after receipt of a trigger signal which varies as a function of said first series of position-indicating signals, and means, including the prepared circuit, for switching between the second and third series of position-indicating signals and also switching between the first and second controllable means after receipt of said first trigger signal.

6. A variable speed master-slave motor control system as claimed in claim 5, and in which said means for switching between the second and third series of position-indicating signals includes a flip-flop stage, which stage is prepared for operation as the cam drives the switching means between one and the other of its positions and which stage is thereafter operated upon receipt of said trigger signal.

7. A variable speed master-slave motor control system as claimed in claim 6, and in which said means for switching between the position-indicating signals and the controllable means further comprises a first pair of gate circuits, connected to receive the second and third series of position-indicating signals and to pass only one series of position-indicating signals to the phase detector, and a second pair of gate circuits, connected to determine which of the gradual signal changes from the first and second controllable means is passed to modify the D-C control signal, with the input signals of both the first and second pairs of gate circuits being determined by the logical output signals of said flip-flop.

8. A variable speed master-slave motor control system as claimed in claim 5, and in which said first and second controllable means are potentiometers having first and second end terminals and a wiper, and further comprising a pair of gate circuits in the means for switching between the first and second controllable means, portions of the gate circuits being respectively coupled to the first and second controllable means, and means including a flip-flop stage for providing logic signals to determine which of the gradual signal changes from the respective wipers is utilized in the circuit at any given time.

References Cited
UNITED STATES PATENTS

| | | | |
|---|---|---|---|
| 3,428,877 | 2/1969 | Campbell et al. | 318—85 |
| 3,430,148 | 2/1969 | Miki | 318—85 X |

THOMAS E. LYNCH, Primary Examiner

U.S. Cl. X.R.

318—85